United States Patent
Yan et al.

(10) Patent No.: US 11,924,017 B2
(45) Date of Patent: Mar. 5, 2024

(54) MULTIPLE ACCESS SCHEMES WITH INTERFERENCE MITIGATION

(71) Applicant: ZTE Corporation, Guangdong (CN)

(72) Inventors: Chunlin Yan, Guangdong (CN); Zhifeng Yuan, Guangdong (CN)

(73) Assignee: ZTE Corporation, Guangdong (CN)

( * ) Notice: Subject to any disclaimer, the term of this patent is extended or adjusted under 35 U.S.C. 154(b) by 82 days.

(21) Appl. No.: 17/168,894

(22) Filed: Feb. 5, 2021

(65) Prior Publication Data
US 2021/0160122 A1    May 27, 2021

Related U.S. Application Data

(63) Continuation of application No. PCT/CN2018/099444, filed on Aug. 8, 2018.

(51) Int. Cl.
*H04L 27/34* (2006.01)
*H04L 1/00* (2006.01)
*H04W 72/044* (2023.01)

(52) U.S. Cl.
CPC ........ *H04L 27/3488* (2013.01); *H04L 1/0071* (2013.01); *H04W 72/0466* (2013.01)

(58) Field of Classification Search
None
See application file for complete search history.

(56) References Cited

U.S. PATENT DOCUMENTS

2005/0243895 A1*  11/2005  Ashikhmin ............. H04J 13/00
                                                           375/146

2012/0027126 A1    2/2012   Park
(Continued)

FOREIGN PATENT DOCUMENTS

| CN | 101048993 A | * | 10/2007 | ........... H04B 1/7103 |
| CN | 101048993 A |   | 10/2007 | |

(Continued)

OTHER PUBLICATIONS

International Search Report and Written Opinion, PCT/CN2018/099444, dated Mar. 18, 9 pages.

(Continued)

*Primary Examiner* — Jeffrey M Rutkowski
*Assistant Examiner* — Mehedi S Aley
(74) *Attorney, Agent, or Firm* — Perkins Coie LLP

(57) ABSTRACT

Methods, systems, and devices for multiple access with interference mitigation are described. An exemplary implementation of interference mitigation in a multiple access scheme includes rearranging a N-th bit stream corresponding to a N-th portion of the input bit stream to generate a N-th rearranged bit stream of K rearranged bit streams, for N=1, 2, . . . , K, generating a modulated symbol stream of hierarchical QAM symbols based on the K rearranged bit streams, where bits from the first rearranged bit stream correspond to one or more most significant bits of the hierarchical QAM symbols, bits from the K-th rearranged bit stream correspond to one or more least significant bits of the hierarchical QAM symbols, and bits from a second to (K−1)-th rearranged bit stream correspond to one or more remaining bits of the hierarchical QAM symbols, and transmitting a signal generated from the modulated symbol stream.

21 Claims, 11 Drawing Sheets

(56) References Cited

U.S. PATENT DOCUMENTS

| | | | | |
|---|---|---|---|---|
| 2013/0070580 A1* | 3/2013 | Wang | ................ | H04J 11/00 |
| | | | | 370/208 |
| 2014/0334561 A1* | 11/2014 | Liang | ................ | H04L 25/03178 |
| | | | | 375/260 |
| 2015/0229413 A1* | 8/2015 | Takeda | ................ | H04W 72/23 |
| | | | | 370/329 |
| 2016/0049999 A1* | 2/2016 | Taherzadeh Boroujeni | ................ | |
| | | | | H04J 13/10 |
| | | | | 370/335 |
| 2018/0192424 A1* | 7/2018 | Zhang | ................ | H04W 72/0473 |
| 2019/0190753 A1* | 6/2019 | Bayesteh | ................ | H04B 1/69 |
| 2020/0186189 A1* | 6/2020 | Herath | ................ | H04B 1/7143 |
| 2021/0058219 A1* | 2/2021 | Kimura | ................ | H04L 5/14 |

FOREIGN PATENT DOCUMENTS

| | | | | | |
|---|---|---|---|---|---|
| CN | 101442383 A | * | 5/2009 | ............ | H04L 1/1819 |
| CN | 101442383 A | | 5/2009 | | |
| CN | 102148796 A | | 8/2011 | | |

OTHER PUBLICATIONS

Chinese Office Action for Application No. 201880096249.3, dated Nov. 3, 2021, 13 pages with unofficial translation.

* cited by examiner

MULTIPLE ACCESS SCHEMES WITH INTERFERENCE MITIGATION

CROSS REFERENCE TO RELATED APPLICATIONS

This patent document is a continuation of and claims benefit of priority to International Patent Application No. PCT/CN2018/099444, filed on Aug. 8, 2018. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, thereby requiring robust interference mitigation when using multiple access protocols.

SUMMARY

This document relates to methods, systems, and devices for multiple access in the presence of interference. The disclosed technology describes methods that can be implemented at a plurality of mobile devices (or terminals, or user equipment) to ensure that they can all access the network with minimal interference from each other.

In one exemplary aspect, a wireless communication method is disclosed. The method includes (a) rearranging a first bit stream corresponding to a first portion of an input bit stream to generate a first rearranged bit stream, the input bit stream comprising K≥2 portions, and where the first rearranged bit stream is a first element of a set of K rearranged bit streams, (b) rearranging a N-th bit stream corresponding to a N-th portion of the input bit stream to generate a N-th rearranged bit stream that is a N-th element of the set of K rearranged bit streams, where N is an integer, (c) performing step (b) for N=2, 3, . . . , K, (d) generating a modulated symbol stream of hierarchical QAM symbols based on the set of K rearranged bit streams, where bits from the first rearranged bit stream correspond to one or more most significant bits of the hierarchical QAM symbols, bits from the K-th rearranged bit stream correspond to one or more least significant bits of the hierarchical QAM symbols, and bits from a second to (K−1)-th rearranged bit stream correspond to one or more remaining bits of the hierarchical QAM symbols, and (e) transmitting a signal generated from the modulated symbol stream.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

In recent years, non-orthogonal multiple access (NOMA) schemes have received significant attention for the fifth generation (5G) cellular networks. One of the reasons 5G implements NOMA is its ability to serve multiple users that are using the same time, frequency and space resources. Some examples of NOMA techniques are based on power-domain multiple access, code-domain multiple access, pattern division multiple access, multiuser shared access, and resource spread multiple access, e.g., power-domain NOMA attains multiplexing in the power domain, whereas code-domain NOMA achieves multiplexing in the code domain.

In one existing implementation, linear spreading may be applied in conjunction with different spreading codes as the multiple access signature. By carefully design the spreading code, multi-user interference can be suppressed effectively. To achieve high spectrum efficiency, high-order modulation may be used, although the bit reliability of each bit in high-order modulation is different. In other words, some bits have high reliability and some bits have low reliability. In the case that the same channel coding is applied for all bits, the bits with low reliability typically degrade the whole system performance.

Figure 1:
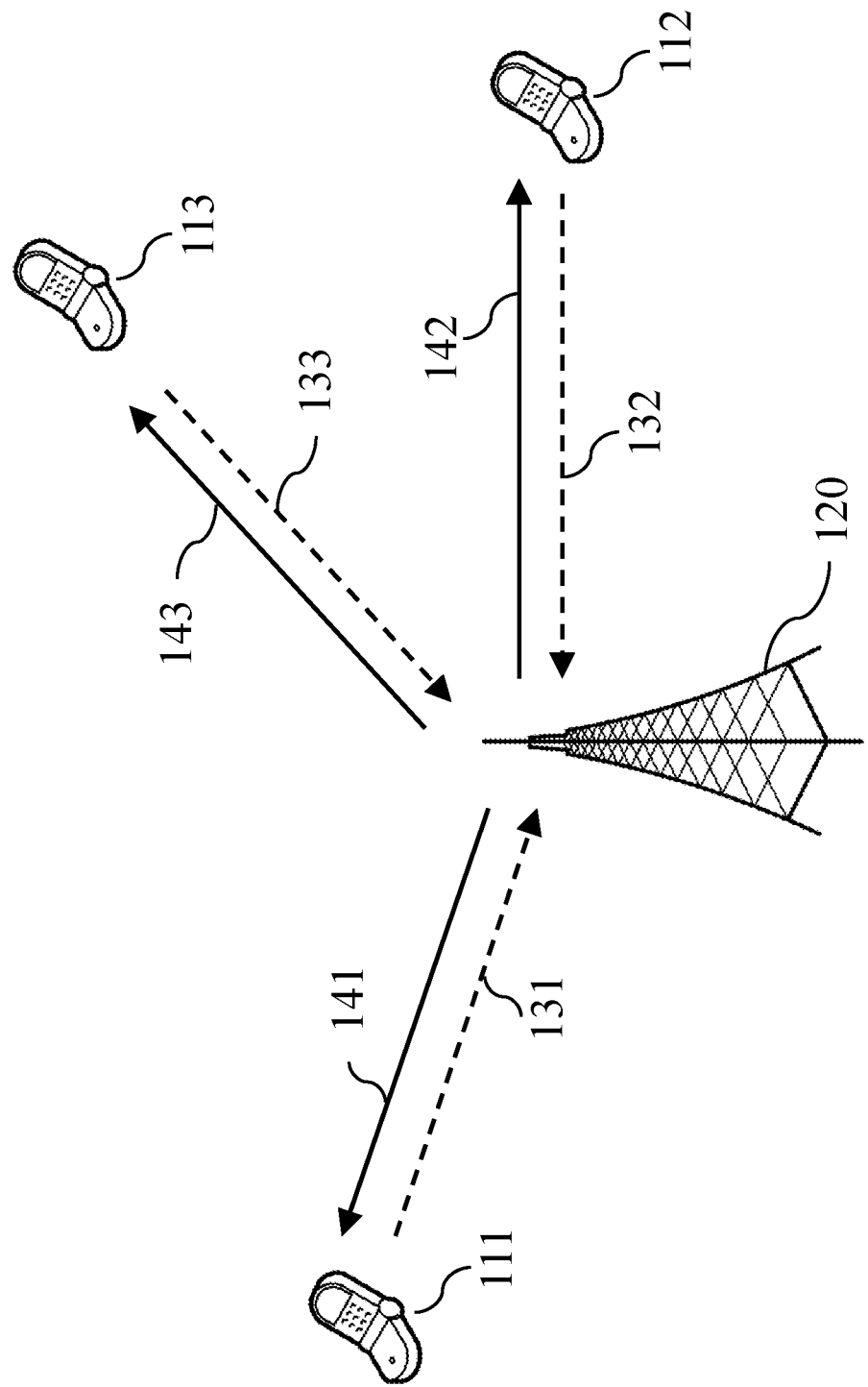
FIG. 1 shows an example of a base station (BS) and user equipment (UE) in wireless communication, in accordance with some embodiments of the presently disclosed technology.

FIG. 1 shows an example of a wireless communication system (e.g., a 5G or NR cellular network) that includes a BS 120 and one or more user equipment (UE) 111, 112 and 113. In some embodiments, the UEs access the BS (e.g., the network) using implementations of the disclosed technology (131, 132, 133), which then enables subsequent communication (141, 142, 143) from the BS to the UEs. The UE may be, for example, a smartphone, a tablet, a mobile computer, a machine to machine (M2M) device, an Internet of Things (IoT) device, and so on.

Figure 2A:
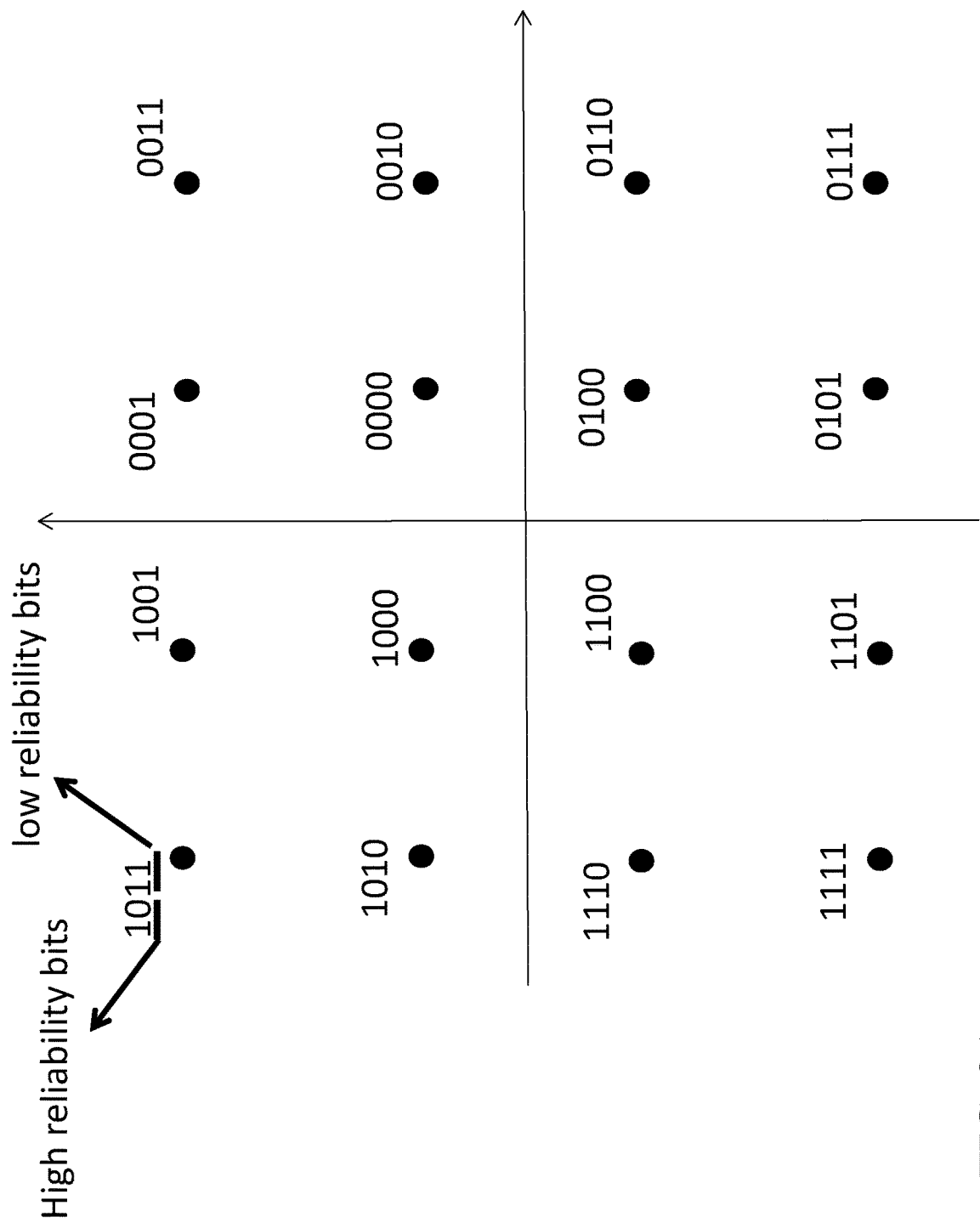
FIGS. 2A and 2B show examples of bit-to-symbol mapping for 16-QAM (quadrature amplitude modulation) and 64-QAM constellations, respectively.

FIG. 2A shows an example of a bit-to-symbol mapping for a 16-QAM constellation, in which each QAM symbol is represented using 4 bits. As shown in FIG. 2A, and for the exemplary symbol "1011", the two most significant bits ("10") are high reliability bits, whereas the two least significant bits ("11") are low-reliability bits. This is due to the fact that all four symbols in the upper left quadrant of the 16-QAM constellation (e.g., "1011", "1001", "1010" and "1000") have the same most significant two bits ("10"). Similarly, all four symbols in each of the quadrants have two most significant bits that are identical. As will be described, this enables the transmission and reception of QAM symbols as hierarchical QAM symbols.

Figure 2B:
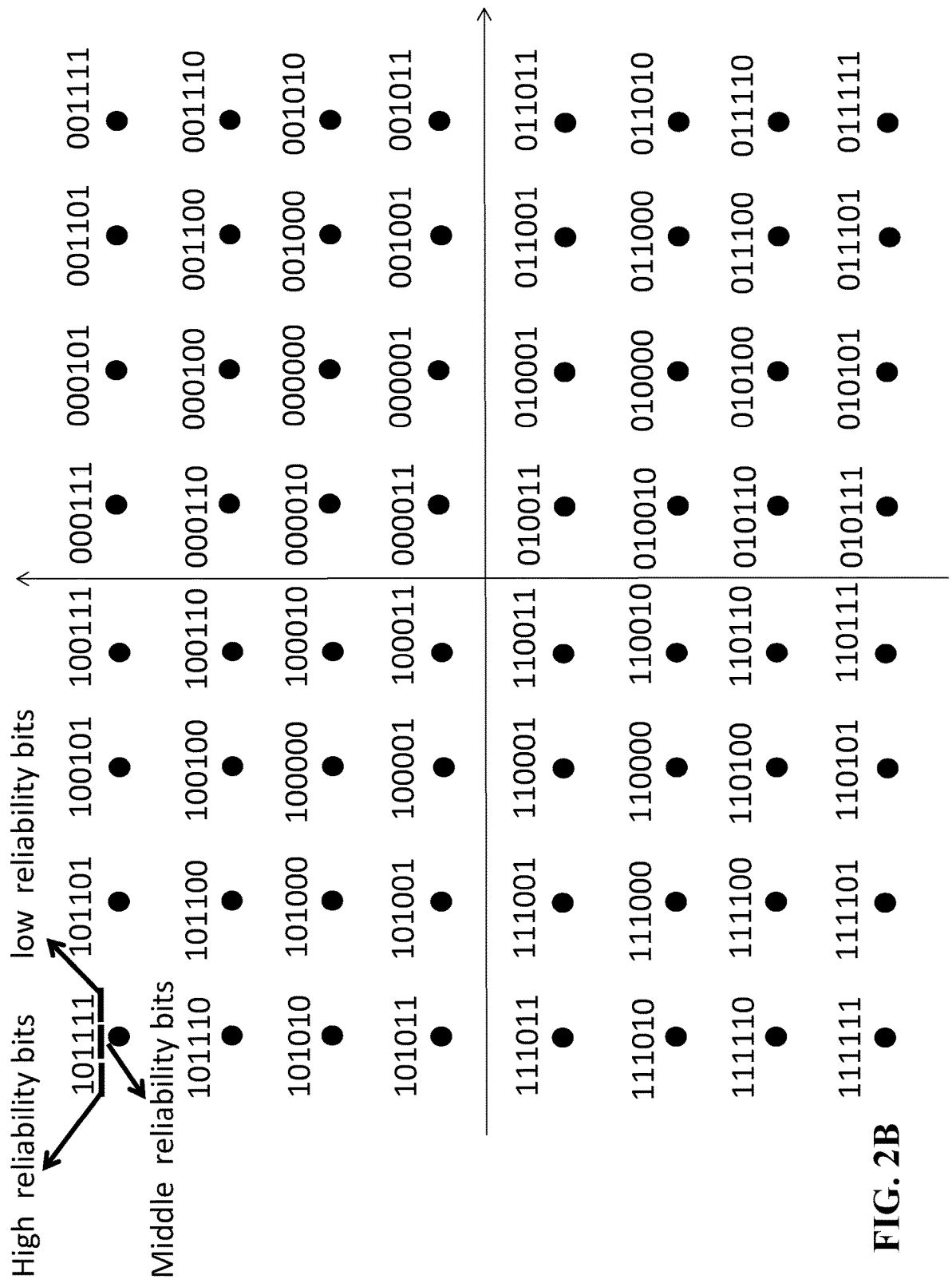

FIG. 2B shows an example of a bit-to-symbol mapping for a 64-QAM constellation, in which each QAM symbol is represented using 6 bits. As shown in FIG. 2B, and for the exemplary symbol "101111", the two most significant bits ("10") are high reliability bits, whereas the two middle significant bits ("11") are middle-reliability bits, whereas the two least significant bits ("11") are low-reliability bits. Similarly, all sixteen symbols in each of the quadrants have two most significant bits that are identical and four symbols in each of the quadrants have two most significant bits that are identical. As will be described, this enables the transmission and reception of QAM symbols as hierarchical QAM symbols.

Some existing implementations, multi-stream transmissions are implemented in which multiple data streams with QPSK modulation are employed. Furthermore, orthogonal spreading codes may be applied to suppress the multi-stream interference. For example, when there are 6 users, each user has two data streams and spreading length is 2, which then requires 12 orthogonal spreading codes. However, designing 12 orthogonal spreading codes with a spreading length of 2 is theoretically impossible.

Figure 3:
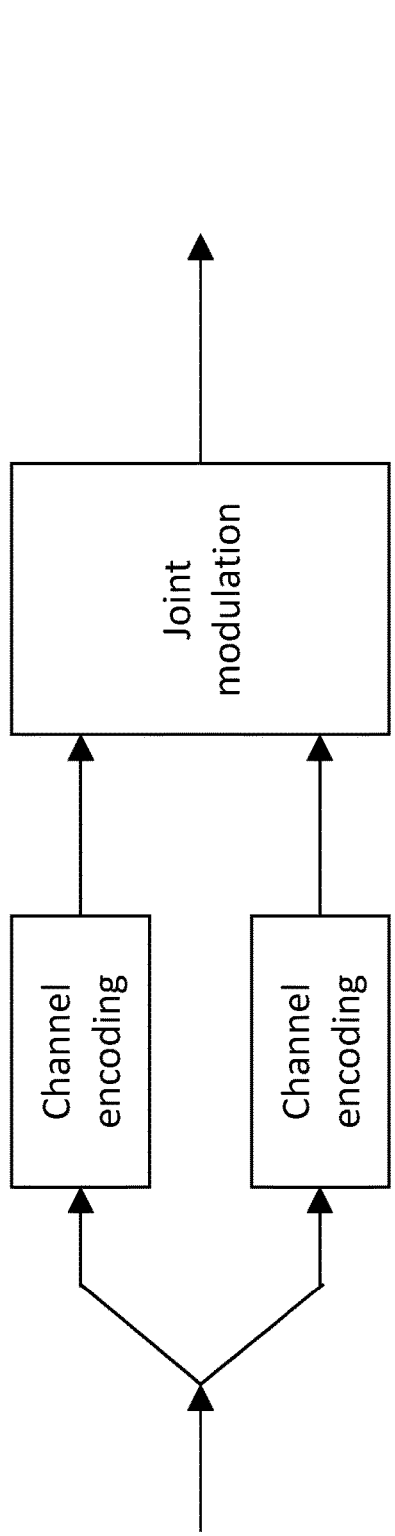
FIG. 3 shows an example of transmitter processing for multiple access.

FIG. 3 shows an example of an existing implementation for multiple access. As shown therein, two streams are encoded separately and jointly modulated.

Figure 4:
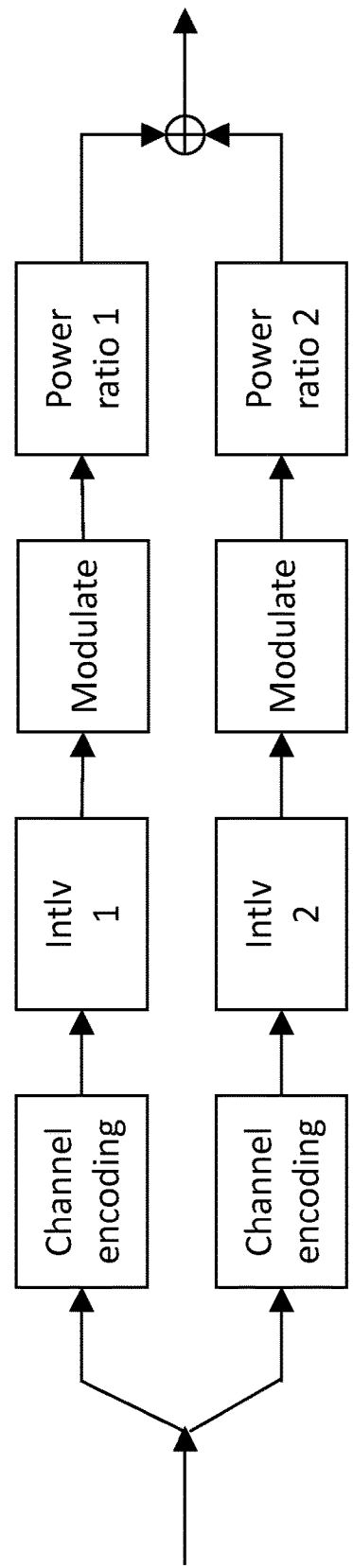
FIG. 4 shows another example of transmitter processing for multiple access.

FIG. 4 shows another example of an existing implementation for multiple access. As shown therein, two streams are encoded, interleaved and modulated separately, and the power ratios of each of the modulated symbol streams may be adjusted independently for each data stream. However, the existing implementations shown in FIGS. 3 and 4 typically do not employ gray-mapping for bits to symbols, which degrades the performance of an (minimum mean squared error) MMSE-SIC (successive interference cancellation) receiver. Additionally, they do not use constellation rotation, which can be used to reduce the peak-to-average power ratio (PAPR).

Embodiments of the disclosed technology overcome these drawbacks, and may implement one or more of constellation rotation, gray-mapping, power ratio and rotation angle optimizations in order to improve system performance when using an MMSE-SIC or iterative receiver.

Figure 5A:
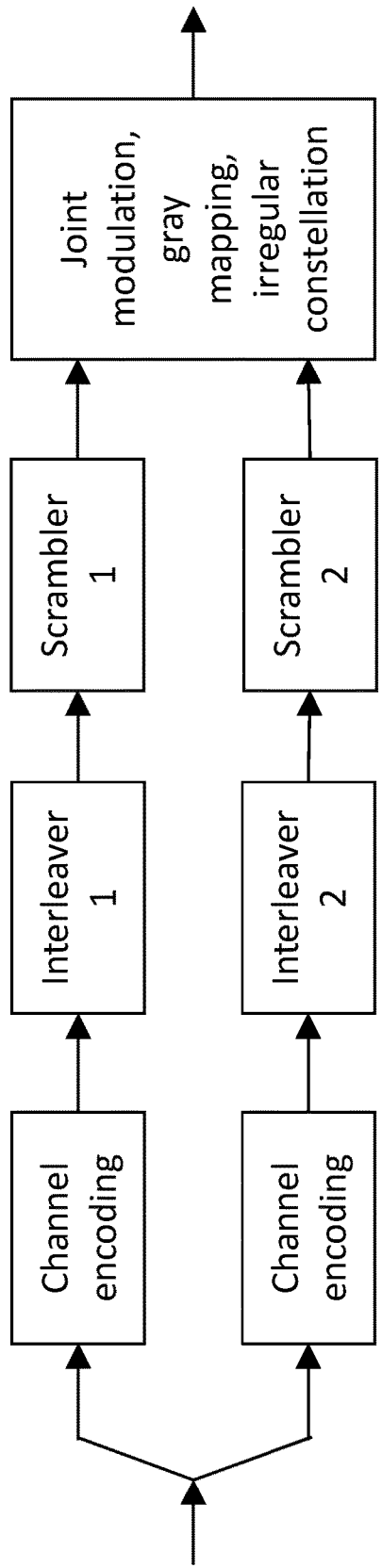
FIGS. 5A and 5B show first examples of transmitter processing for multiple access that supports interference mitigation.
Figure 5B:
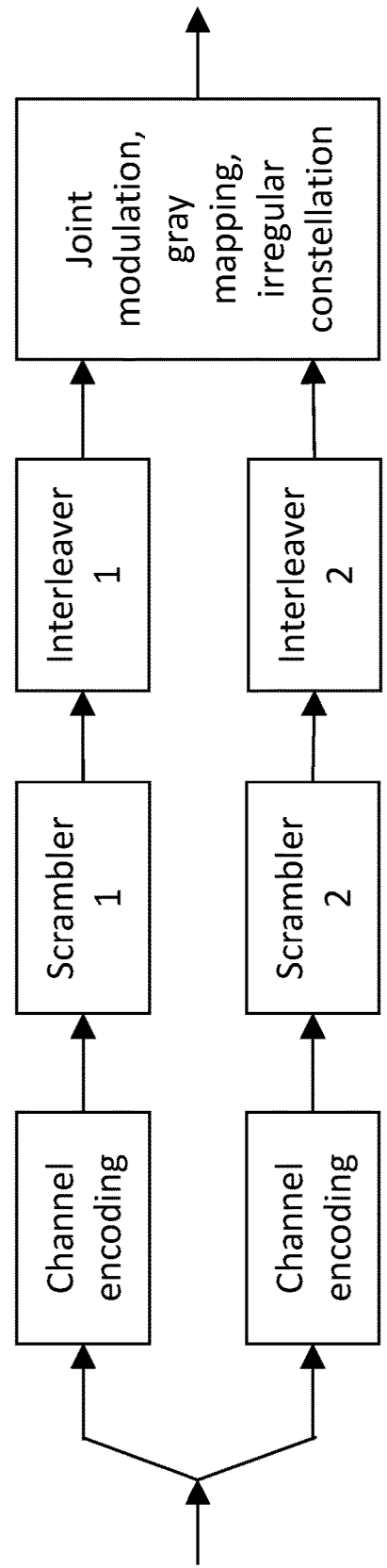

FIGS. 5A and 5B show examples of a first type of transmitter processing for multiple access that supports interference mitigation where two data streams are employed. As shown in FIG. 5A, different interleavers (e.g., with different interleaving patterns) may be applied to each of the two data streams after channel coding, which is then followed by scrambling (e.g. with different scrambling patterns for each of the two data streams). In FIG. 5B, the scrambling operation may be performed before the interleaving operation. The different interleaving patterns advantageously randomize the multi-user interference, thereby improving system performance when using an iterative detector. In some embodiments, the implementation complexity may be reduced by having different interleavers use cyclic shifts of a common interleaving pattern (e.g., different values of the cyclic shift for each interleaver). For example, different users and different data streams may have different cyclic shifts. In some embodiments, irregular constellations may be used in the modulation stage to advantageously reduce the PAPR and improve system performance.

Figure 6A:
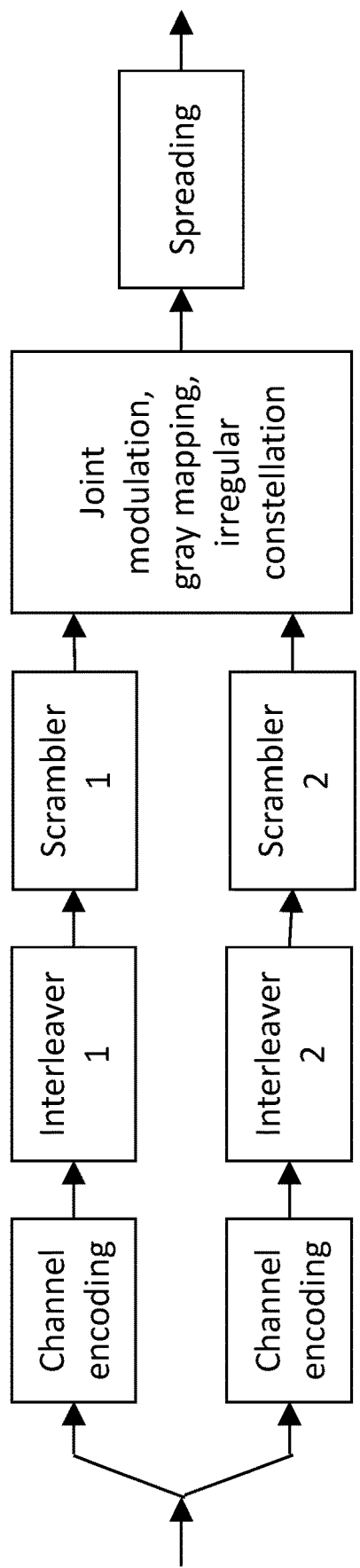
FIGS. 6A and 6B show second examples of transmitter processing for multiple access that supports interference mitigation.
Figure 6B:
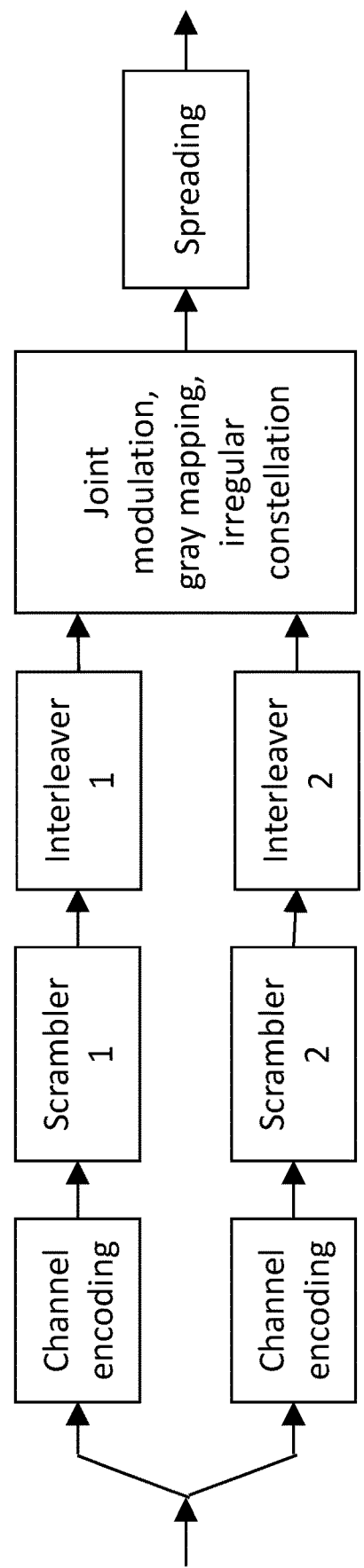

FIGS. 6A and 6B show examples of a second type of transmitter processing for multiple access that supports interference mitigation. This example includes some features and/or components that are similar to those shown in FIG. 5, and described above. At least some of these features and/or components may not be separately described in this section.

As shown in FIGS. 6A and 6B, the transmitter processing may include spreading, thereby embodying the advantages of interleaver-based NOMA schemes as well as spreading-based NOMA schemes. In some embodiments, the transmitter processing shown in FIGS. 6A and 6B may be used in conjunction with a receiver that implements an MMSE-SIC or iterative detector, such as ESE (elementary signal estimator) or EPA (expectation propagation algorithm).

In some embodiments, the criterion used to design the spreading code are different for MMSE-SIC detectors and iterative detectors. When an MMSE-SIC detector is applied, the spreading codes should typically have low cross correlation to reduce the multi-user interference. On the other hand, for an iterative detector, short cycles in the graph representation of the decoding algorithm should be avoided. For example, by adding zeros in the spreading code, short cycles can be reduced significantly. Thus, in some embodiments, zeros may be included in the spreading code design.

For example, for a spreading length of 2, the spreading code shown in Table 1 may be employed.

TABLE 1

Example spreading code for spreading length = 2

| 0 | [1, 1] |
| 1 | [1, −1] |
| 2 | [1, j] |
| 3 | [1, −j] |
| 4 | [√2, 0] |
| 5 | [0, √2] |
| 6 | [√2j, 0] |
| 7 | [0, √2j] |

For example, for a spreading length of 3, the spreading code shown in Table 2 may be employed.

TABLE 2

Example spreading code for spreading length = 3

| 0 | [1, 0, j] |
| 1 | [1, 0, −j] |
| 2 | [1, j, 0] |
| 3 | [0, 1, −1] |
| 4 | [1, 0, 1] |
| 5 | [1, 1, 0] |
| 6 | [1, −j, 0] |
| 7 | [0, 1, j] |

TABLE 2-continued

Example spreading code for spreading length = 3

| | |
|---|---|
| 8 | [1, 0, −1] |
| 9 | [1, −1, 0] |
| 10 | [0, 1, 1] |
| 11 | [0, 1, −j] |
| 12 | [1, 0, 0] |
| 13 | [0, 1, 0] |
| 14 | [0, 0, 1] |
| 15 | [j, 0, 0] |
| 16 | [0, j, 0] |
| 17 | [0, 0, j] |

For example, for a spreading length of 4, the spreading code shown in Table 3 may be employed.

TABLE 3

Example spreading code for spreading length = 4

| | |
|---|---|
| 0 | [1, 1, 0, 0] |
| 1 | [1, −1, 0, 0] |
| 2 | [1, j, 0, 0] |
| 3 | [1, −j, 0, 0] |
| 4 | [1, 0, 1, 0] |
| 5 | [1, 0, −1, 0] |
| 6 | [1, 0, j, 0] |
| 7 | [1, 0, −j, 0] |
| 8 | [1, 0, 0, 1] |
| 9 | [1, 0, 0, −1] |
| 10 | [1, 0, 0, j] |
| 11 | [1, 0, 0, −j] |
| 12 | [0, 1, 1, 0] |
| 13 | [0, 1, −1, 0] |
| 14 | [0, 1, j, 0] |
| 15 | [0, 1, −j, 0] |
| 16 | [0, 1, 0, 1] |
| 17 | [0, 1, 0, −1] |
| 18 | [0, 1, 0, j] |
| 19 | [0, 1, 0, −j] |
| 20 | [0, 0, 1, 1] |
| 21 | [0, 0, 1, −1] |
| 22 | [0, 0, 1, j] |
| 23 | [0, 0, 1, −j] |

The ideal sequences that are selected are those with low correlation, which will achieve the optimal block error rate performance. For example, if there are 12 users, the sequences could be [0, 0, 1, 1; 0, 0, 1, −1; 1, 0, 1, 0; 1, 0, −1, 0; 1, 0, 0, 1; 1, 0, 0, −1; 1, j, 0, 0; 1, −j, 0, 0; 0, 1, 0, j; 0, 1, 0, −j; 0, 1, 1, 0; 0, 1, −1, 0]. Since there are 24 sequences shown in Table 3, the other 12 sequences could also be selected. In the sequences described, [0, 0, 1, 1; 0, 0, 1, −1] can be replace by [0, 0, 1, j; 0, 0, 1 j], [0, 0, 1, j; 0, 0, 1 j] can be replaced by [0, 0, 1, 1; 0, 0, 1, −1], and so on.

As shown in FIG. 6, the two data streams are superposed together, thereby avoiding the need to suppress the interference from the two data streams being mapped on the same symbol. In some embodiments, a joint MMSE operation can be performed on the two data streams mapped on the same symbol. After demodulation, the soft information of the first two bits are input to the channel decoder and the soft information of the last two bits are input to another channel decoder after interleaver processing. When the data stream mapped on the high reliability is decoded successfully, it can be removed from the received signal by using the soft information output from the decoder. This implementation may facilitate the detection and decoding of the data stream mapped on the low reliability bits.

In some embodiments, bit repetition is included in the channel coding. For example code rate 2/3 is employed with a bit repetition number of 2, then an equivalent code rate of 1/3 is obtained. Bit repetition typically improves the block error rate performance when number of user is large. As an example after channel encoding, if the output bit sequence is "[0, 1, 0, 0, 1, 1]", the result of bit repetition by 2 yields "[0, 0, 1, 1, 0, 0, 0, 0, 1, 1, 1, 1]".

In some embodiments, bit flipping may applied in conjunction with bit repetition so as to further randomize the input bits. In bit flipping, a "0" bit changes to a "1" bit, and vice versa. As in the example above, the output bit sequence after channel encoding is "[0, 1, 0, 0, 1, 1]", and the result of bit repetition by 2 with bit flipping yields "[0, 1, 1, 0, 0, 1, 0, 1, 1, 0, 1, 0]", wherein the second bit of the bit repetition has been flipped.

In some embodiments, the constellation of joint bit-to-symbol mapping can be expressed as follows:

$$s = +e^{j\theta_1}\sqrt{p_1}s_1 + e^{j\theta_2}\sqrt{p_2}s_2.$$

Here, $p_1$ and $p_2$ are the powers allocated to streams 1 and 2, respectively, $\theta_1$ and $\theta_2$ are the phase rotations for streams 1 and 2, respectively, and $s_1$ and $s_2$ may be points from a QPSK constellation. More generally, the constellation point can be expressed as:

$$s = \sum_{i=1}^{N} e^{j\theta_i}\sqrt{p_i}\,s_i.$$

Here, $p_1$ and $\theta_i$ are the power allocated to and phase rotation for stream i, and $s_i$ may be a point from a QPSK constellation. The power allocation and phase allocation can be applied for block error rate performance enhancement or PAPR (peak-to-average power ratio) reduction. For different user number, information length and block length, spreading factor, number of data streams, power ratio and rotation angle can be adjusted to achieve the best block error rate performance of PAPR performance.

With regard to the PAPR, a single-carrier frequency-division multiple access (SC-FDMA) scheme has a lower PAPR compared to an OFDM system with frequency-domain spreading. The latter method, which may be used to implement embodiments of the disclosed technology, may be improved by using different constellations on different subcarriers when spreading is employed. In other words, when spreading is used (as shown in FIG. 6), the constellations for each OFDM subcarrier may varied by adjusting the respective power ratio and phase rotation angle so as to reduce the PAPR.

Figure 7A:
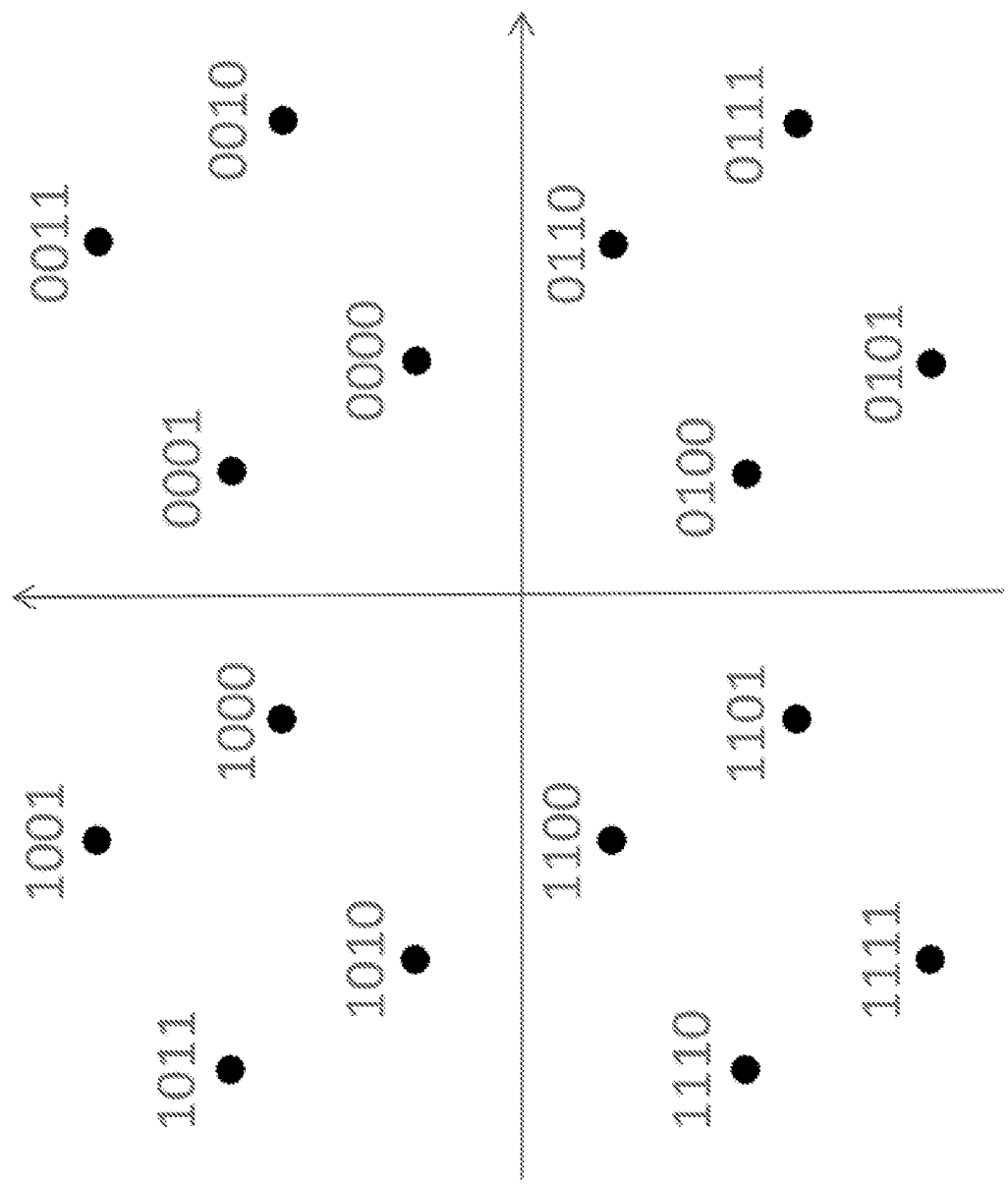
FIGS. 7A and 7B show examples of distinct 16-QAM constellations that may be used on different subcarriers in an OFDM system.
Figure 7B:
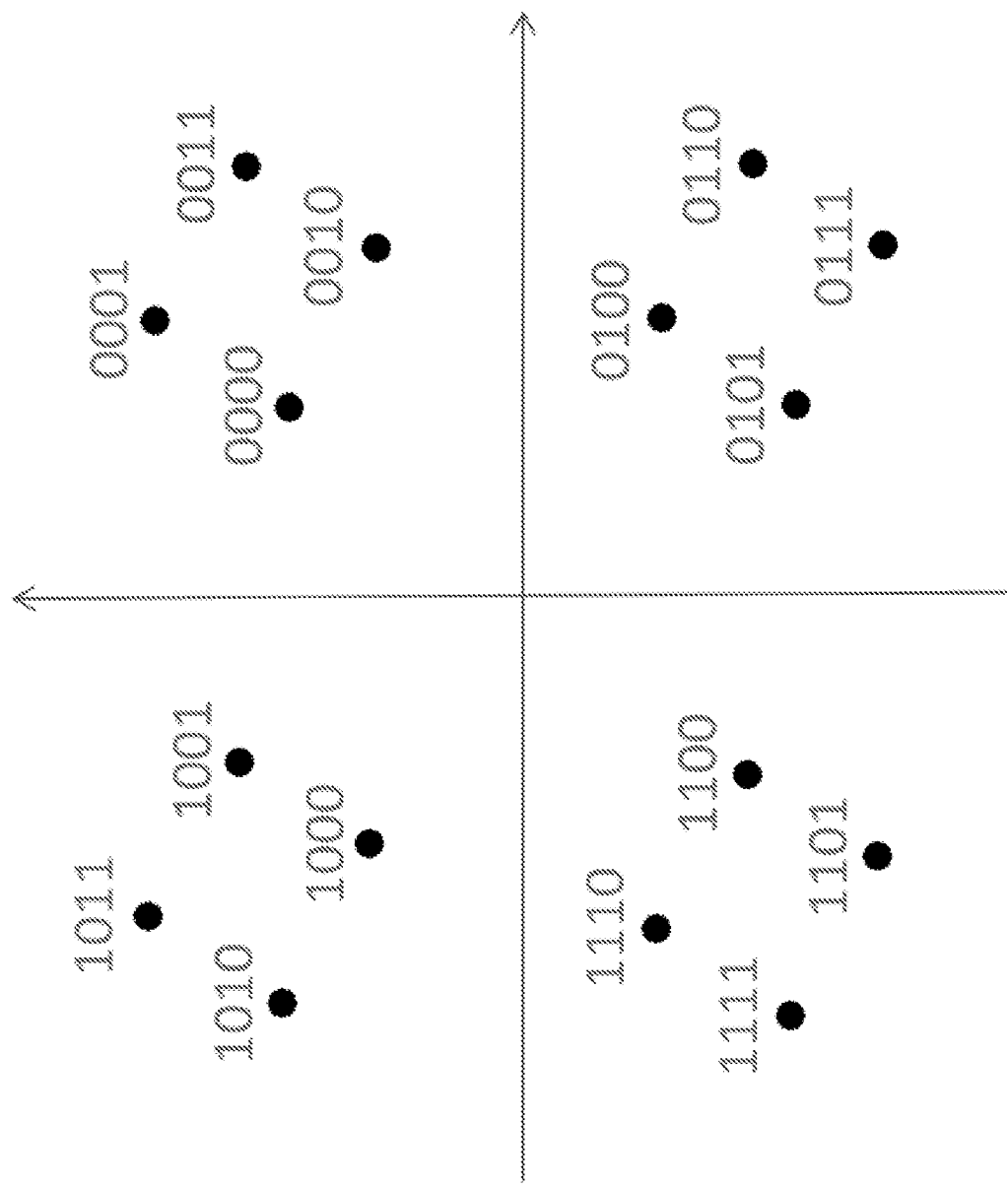

FIGS. 7A and 7B show examples of 16-point constellations with different power ratios and phase rotation angles. In some embodiments, spreading may be implemented by the symbol being multiplied by the spreading sequence (e.g., from the set [0, 1, −1, j, −j]) after repetition. This advantageously results in reducing the PAPR.

In some embodiments, a higher order modulation may be employed, in which case the input bit stream may be divided into multiple component streams (e.g. K), each of which is encoded separately. Different interleaving patterns may be used for each stream to randomize the coded bits. In an example, this is followed by mapping stream 1 onto the highest priority bits (also referred to the most significant bits, or most reliable bits), stream 2 is mapped onto the bits with the next highest priority, and so on, with stream K being mapped to the lowest priority bits.

In some embodiments, the shape of the resulting constellation is based on the power allocation and phase rotations among the K different streams.

In some embodiments, the power ratios of all K different streams are zeros for partial signals. The transmitted information can be recovered from the remaining signal whose power ratios of K different streams are larger than zeros. By setting power ratios of all K different streams are zeros for partial signal, the interference among signals from different users can be reduced, which will facilitate the transmitted information recovery. The amount of signals whose power ratios are zeros is determined by achieving the minimum block error rate performance.

In some embodiments, gray bit-to-symbol mapping may be employed, wherein only one bit changes between neighboring symbols. Gray-mapping advantageously improves the system block error rate performance when MMSE-SIC is used in these implementations.

As described above, embodiments of the disclosed technology enable multiple access while supporting interference mitigation by adjusting and adapting the transmitter processing at each terminal (or mobile device, or UE). In some embodiments, the techniques that may be used, either individually or in any combination, include:

(1) Dividing the input data stream into K streams with separate channel coding and distinct interleaving patterns that randomize the coded bits. All the K streams may be jointly modulated onto a constellation with gray-coded bit-to-symbol mapping, such that stream 1 is mapped to the highest priority bits of the constellation symbols, stream 2 is mapped onto the bit with the next highest priority, and so on, with stream K being mapped to the lowest priority bits.

(2) The constellation being interpreted (at an iterative or MMSE-SIC receiver) as the superposition of two smaller sized constellations as a result of power allocation and phase rotation. For example, each point of a "parent" QPSK constellation may be the center of a "child" QPSK constellation, as in the examples shown in FIGS. 7A and 7B.

(3) The power ratios and rotation angles can be different on different subcarriers.

Figure 8:
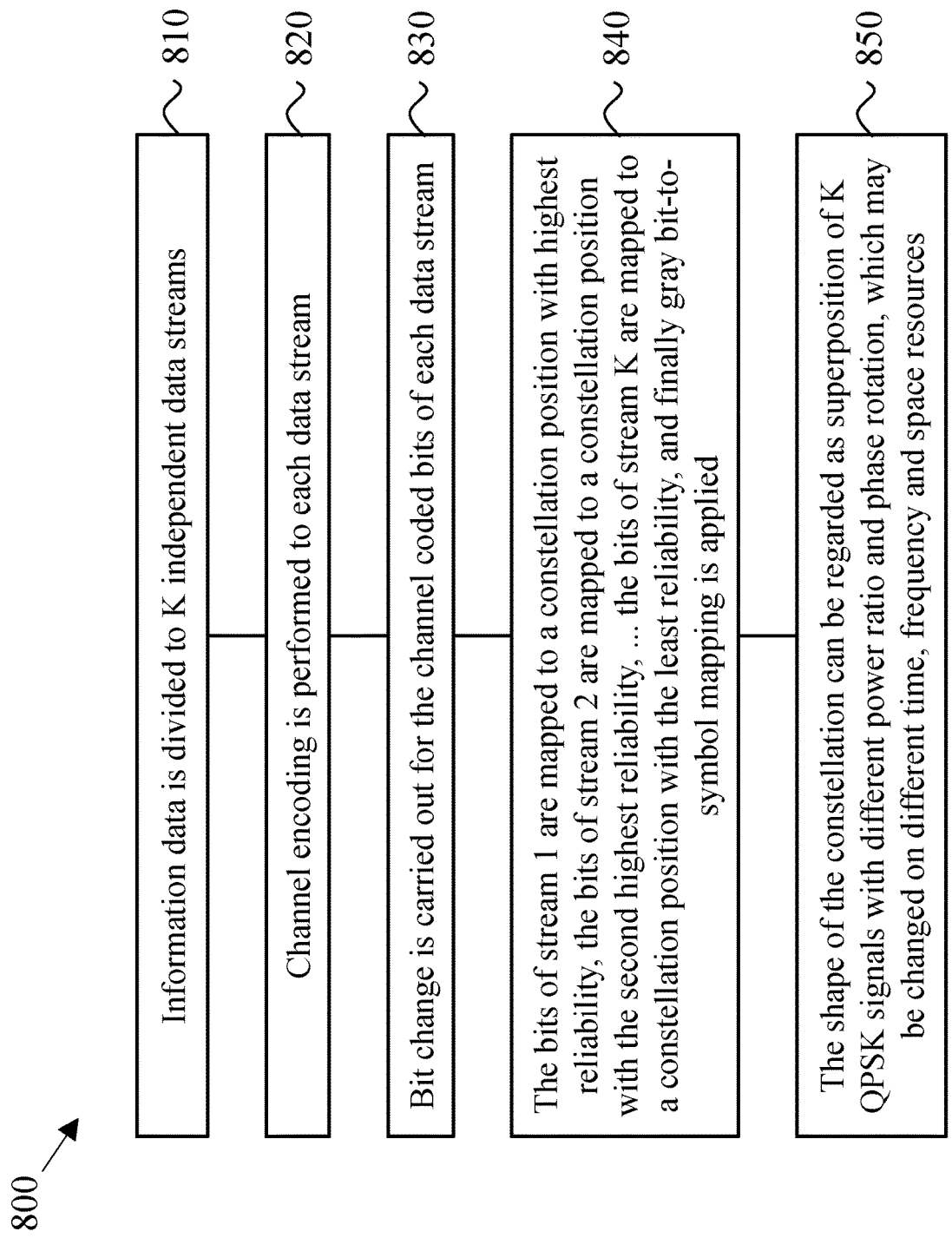
FIG. 8 shows an example of a wireless communication method that may be implemented on a wireless communication apparatus (or user equipment).

FIG. 8 shows an example of a wireless communication method 800 for multiple access that supports interference mitigation. The method 800 includes, at step 810, information data is divided to K independent data streams.

The method 800 includes, at step 820, channel encoding is performed to each data stream. In some embodiments, the same channel code is applied to each data stream.

The method 800 includes, at step 830, a bit change is carried out on the channel coded bits of each data stream. In some embodiments, the bit change includes bit repetition, bit flipping, or bit repetition following by bit flipping. In other embodiments, the bit change may include interleaving and scrambling operations, which may be implemented in any order.

The method 800 includes, at step 840, the bits of stream 1 are mapped to a constellation position with highest reliability, the bits of stream 2 are mapped to a constellation position with the second highest reliability, . . . the bits of stream K are mapped to a constellation position with the least reliability, and finally gray bit-to-symbol mapping is applied.

The method 800 includes, at step 850, the shape of the constellation can be regarded as superposition of K QPSK signals with different power ratio and phase rotation, which may be changed on different time, frequency and space resources.

Figure 9:
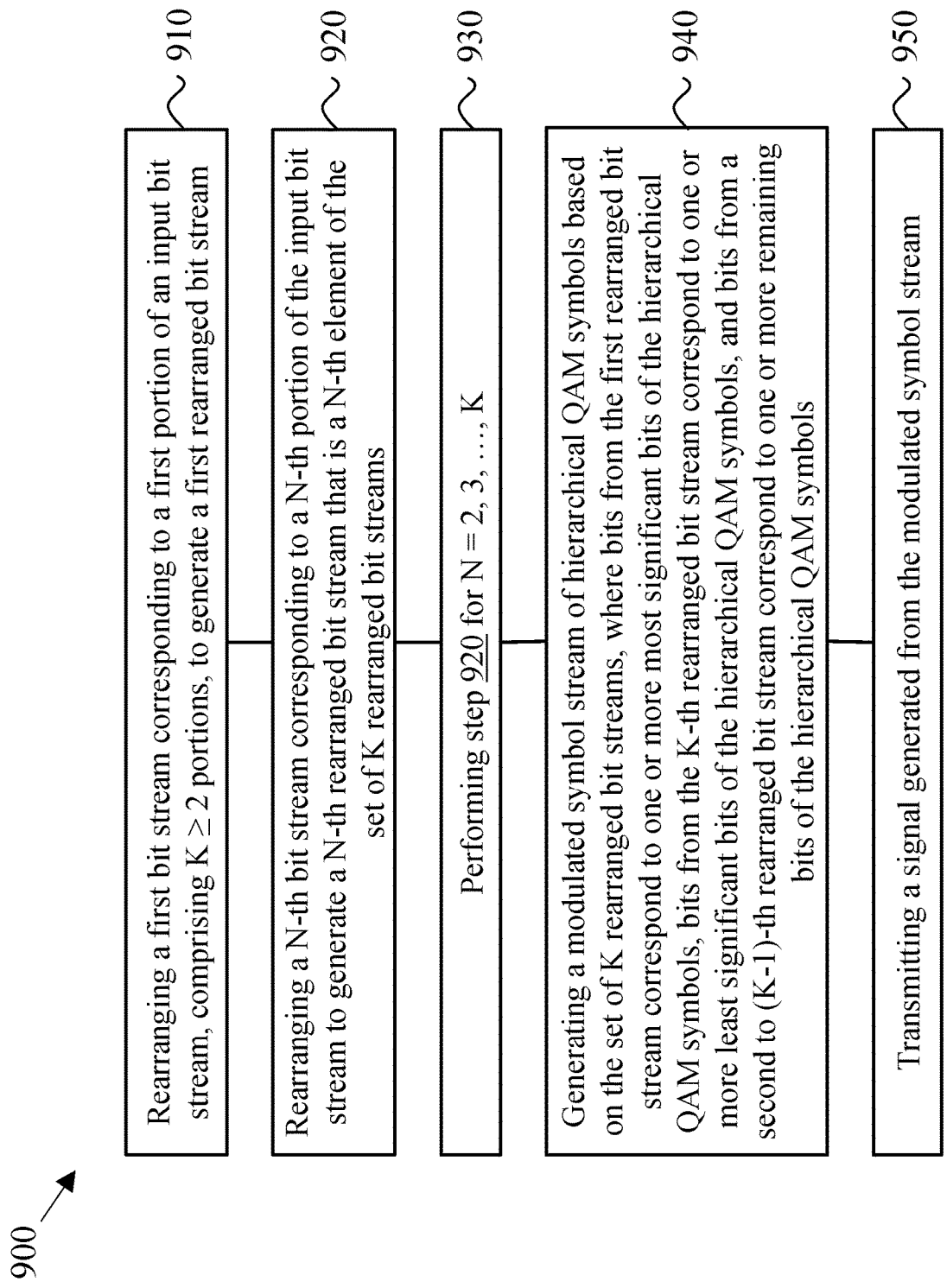
FIG. 9 shows an example of another wireless communication method that may be implemented on a wireless communication apparatus (or user equipment).
Figure 10:
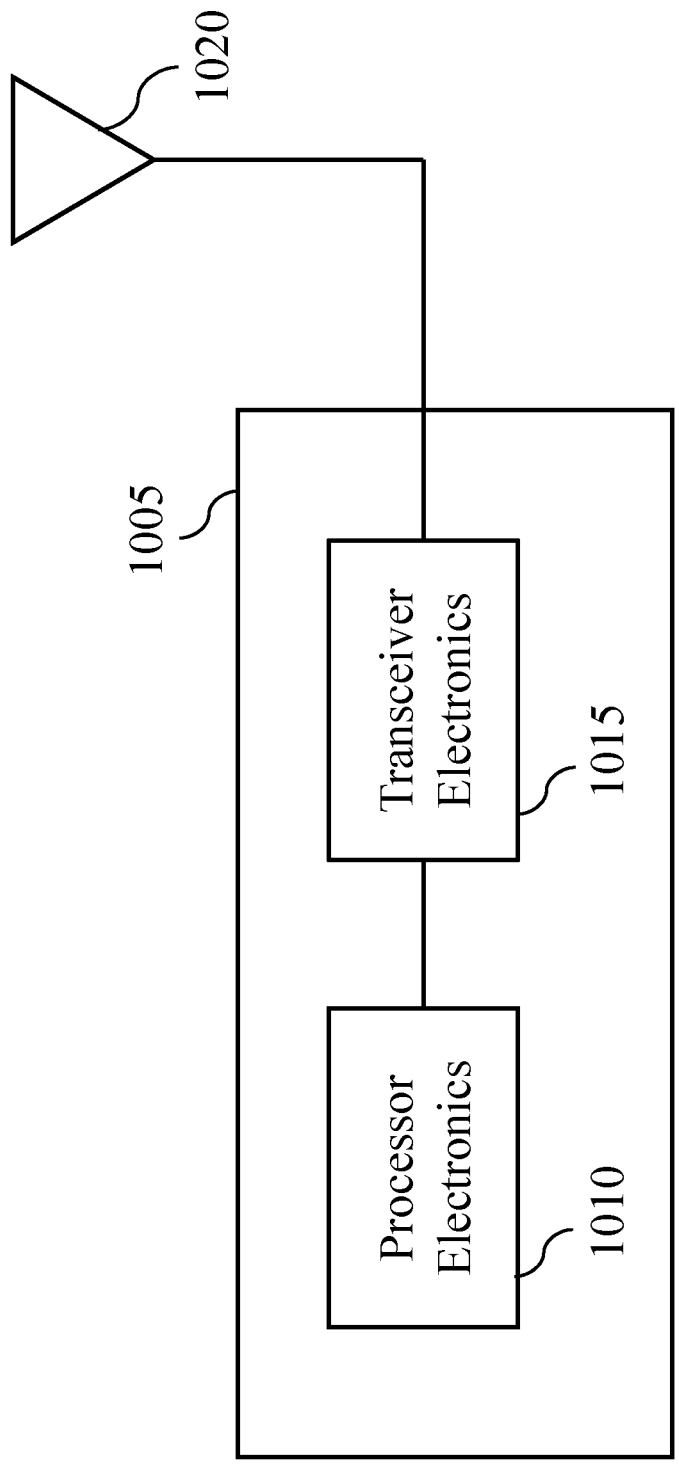
FIG. 10 is a block diagram representation of a portion of an apparatus, in accordance with some embodiments of the presently disclosed technology.

FIG. 9 shows another example of a wireless communication method 900 for multiple access that supports interference mitigation. The method 900 includes, at step 910, rearranging a first bit stream corresponding to a first portion of an input bit stream, comprising K≥2 portions, to generate a first rearranged bit stream.

The method 900 includes, at step 920, rearranging a N-th bit stream corresponding to a N-th portion of the input bit stream to generate a N-th rearranged bit stream that is a N-th element of the set of K rearranged bit streams. In some embodiments, the rearranging includes interleaving based on a set of K interleaving patterns. For example, the interleaving step may be skipped by using an M-th interleaving pattern defined as $[1, 2, \ldots B_M]$, wherein $B_M$ is a number of bits in the M-th portion of the input bit stream, and wherein $M=1, 2, \ldots, K$. In an example, the interleaving pattern may be a user equipment (UE)-specific interleaving pattern. In another example, the UE-specific interleaving pattern may be based on a UE identification.

In some embodiments, the rearranging includes scrambling based on a set of K scrambling patterns. In an example, the scrambling is performed before the interleaving, and in another example, the scrambling is performed after the interleaving. In yet another example, the scrambling pattern is a user equipment (UE)-specific scrambling pattern, which may be based on the UE identification, or it may be a cell-specific scrambling pattern.

The method 900 includes, at step 930, performing step 920 for $N=2, 3, \ldots, K$.

The method 900 includes, at step 940, generating a modulated symbol stream of hierarchical QAM symbols based on the set of K rearranged bit streams, where bits from the first rearranged bit stream correspond to one or more most significant bits of the hierarchical QAM symbols, bits from the K-th rearranged bit stream correspond to one or more least significant bits of the hierarchical QAM symbols, and bits from a second to $(K-1)$-th rearranged bit stream correspond to one or more remaining bits of the hierarchical QAM symbols.

In some embodiments, the hierarchical QAM symbols are selected from a single QAM constellation. In other embodiments, the hierarchical QAM symbols are selected from a superposition of multiple QAM constellations, where each of the multiple QAM constellations comprises a distinct power ratio and a distinct rotation angle. In an example, the distinct power ratios and rotation angles are selected on different time or frequency resources to balance between minimizing an average block error rate (BLER) and reducing a peak-to-average power ratio (PAPR) of the modulated symbol stream.

In some embodiments, the signal is generated by spreading the modulated symbol stream, and wherein the spreading is based on a spreading factor and a spreading sequence. In an example, the spreading sequences have low cross correlation.

The method 900 includes, at step 950, transmitting a signal generated from the modulated symbol stream.

FIG. 9 is a block diagram representation of a portion of an apparatus, in accordance with some embodiments of the presently disclosed technology. An apparatus 905, such as a base station or a wireless device (or UE), can include processor electronics 910 such as a microprocessor that implements one or more of the techniques presented in this document. The apparatus 905 can include transceiver electronics 915 to send and/or receive wireless signals over one or more communication interfaces such as antenna(s) 920. The apparatus 905 can include other communication interfaces for transmitting and receiving data. Apparatus 905 can include one or more memories (not explicitly shown) configured to store information such as data and/or instructions.

In some implementations, the processor electronics 910 can include at least a portion of the transceiver electronics 915. In some embodiments, at least some of the disclosed techniques, modules or functions are implemented using the apparatus 905.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
  (a) rearranging a first bit stream corresponding to a first portion of an input bit stream to generate a first rearranged bit stream, wherein the input bit stream comprises K portions, wherein K is an integer greater than 1, and wherein the first rearranged bit stream is a first element of a set of K rearranged bit streams;
  (b) rearranging a N-th bit stream corresponding to a N-th portion of the input bit stream to generate a N-th rearranged bit stream that is a N-th element of the set of K rearranged bit streams, wherein N is an integer;
  (c) performing step (b) for N=2, 3, . . . , K;
  (d) generating a modulated symbol stream of hierarchical quadrature amplitude modulation (QAM) symbols based on the set of K rearranged bit streams, wherein bits from the first rearranged bit stream correspond to one or more most significant bits of the hierarchical QAM symbols, wherein bits from a K-th rearranged bit stream correspond to one or more least significant bits of the hierarchical QAM symbols, and wherein bits from a second to (K−1)-th rearranged bit stream correspond to one or more remaining bits of the hierarchical QAM symbols,
    wherein the hierarchical QAM symbols are selected from a superposition of multiple QAM constellations, and wherein each of the multiple QAM constellations comprises a distinct power ratio and a distinct rotation angle; and
  (e) transmitting a signal generated from the modulated symbol stream,
    wherein the signal is generated by spreading the modulated symbol stream,
    wherein the spreading is based on a spreading factor and a spreading sequence,
    wherein the spreading sequence is from spreading sequences that have low cross correlation,
    wherein, in response to the spreading factor being 2, the spreading sequences are defined as $[(1,1); (1,-1); (1,j); (1,-j); (\sqrt{2},0); (0,\sqrt{2}); (\sqrt{2}j,0); (0,\sqrt{2}j)]$, and wherein $j^2=-1$.

2. The method of claim 1, wherein the rearranging comprises interleaving based on a set of K interleaving patterns.

3. The method of claim 2, wherein an M-th interleaving pattern of the K interleaving patterns is defined as $[1, 2, \ldots B_M]$, wherein $B_M$ is a number of bits in a M-th portion of the input bit stream, and wherein $M=1, 2, \ldots, K$.

4. The method of claim 2, wherein at least one interleaving pattern of the set of K interleaving patterns is a user equipment (UE)-specific interleaving pattern that is based on a UE identification (ID).

5. The method of claim 2, wherein the rearranging comprises scrambling based on a set of K scrambling patterns, and wherein the scrambling is performed either before the interleaving or after the interleaving.

6. The method of claim 5, wherein at least one scrambling pattern of the set of K scrambling patterns is a user equipment (UE)-specific scrambling pattern.

7. The method of claim 6, wherein the user equipment (UE)-specific scrambling pattern is based on a UE identification (ID).

8. The method of claim 5, wherein at least one scrambling pattern of the set of K scrambling patterns is a cell-specific scrambling pattern.

9. The method of claim 1, wherein, in response to the spreading factor being 4, the spreading sequences are defined as [0, 0, 1, 1; 0, 0, 1, −1; 1, 0, 1, 0; 1, 0, −1, 0; 1, 0, 0, 1; 1, 0, 0, −1; 1, j, 0, 0; 1, −j, 0, 0; 0, 1, 0, j; 0, 1, 0, −j; 0, 1, 1, 0; 0, 1, −1, 0] or [1, 1, 0, 0; 1, −1, 0, 0; 1, 0, j, 0; 1, 0, −j, 0; 0, 1, 0, 1; 0, 1, 0, −1; 1, 0, 0, j; 1, 0, 0, −j; 0, 1, j, 0; 0, 1, −j, 0; 0, 0, 1, j; 0, 0, 1, −j]], and wherein $j^2=-1$.

10. The method of claim 1, further comprising:
(f) encoding, based on a channel code, a Q-th portion of the input bit stream to generate a Q-th bit stream; and
(g) performing step (f) for Q=1, 2, . . . , K.

11. The method of claim 10, further comprising:
repeating one or more bits of the Q-th bit stream a predetermined number of times; and/or
bit flipping one or more bits of the Q-th bit stream.

12. The method of claim 1, wherein the distinct power ratios and rotation angles are selected on different time or frequency resources to balance between minimizing an average block error rate (BLER) and reducing a peak-to-average power ratio (PAPR) of the modulated symbol stream.

13. The method of claim 1, wherein the power ratio for each of the multiple QAM constellations is zero for at least one time or frequency resource.

14. The method of claim 1, wherein the power ratio for a number of the multiple QAM constellations is zero, and wherein the number is determined based on a minimum average block error rate.

15. The method of claim 1, wherein the integer K, a spreading factor and the distinct power ratios are optimized upon determining that a number of information bits of the input bit stream has changed.

16. An apparatus for wireless communication, comprising:
a processor configured to:
(a) rearrange a first bit stream corresponding to a first portion of an input bit stream to generate a first rearranged bit stream, wherein the input bit stream comprises K portions, wherein K is an integer greater than 1, and wherein the first rearranged bit stream is a first element of a set of K rearranged bit streams;
(b) rearrange a N-th bit stream corresponding to a N-th portion of the input bit stream to generate a N-th rearranged bit stream that is a N-th element of the set of K rearranged bit streams, wherein N is an integer;
(c) perform step (b) for N=2, 3, . . . , K;
(d) generate a modulated symbol stream of hierarchical quadrature amplitude modulation (QAM) symbols based on the set of K rearranged bit streams, wherein bits from the first rearranged bit stream correspond to one or more most significant bits of the hierarchical QAM symbols, wherein bits from a K-th rearranged bit stream correspond to one or more least significant bits of the hierarchical QAM symbols, and wherein bits from a second to (K−1)-th rearranged bit stream correspond to one or more remaining bits of the hierarchical QAM symbols,
wherein the hierarchical QAM symbols are selected from a superposition of multiple QAM constellations, and wherein each of the multiple QAM constellations comprises a distinct power ratio and a distinct rotation angle; and
(e) transmit a signal generated from the modulated symbol stream,
wherein the signal is generated by spreading the modulated symbol stream,
wherein the spreading is based on a spreading factor and a spreading sequence,
wherein the spreading sequence is from spreading sequences that have low cross correlation,
wherein, in response to the spreading factor being 2, the spreading sequences are defined as [(1,1); (1,−1); (1,j); (1,−j); ($\sqrt{2}$,0); (0,$\sqrt{2}$); ($\sqrt{2}$j,0); (0,$\sqrt{2}$j)], and wherein $j^2=-1$.

17. The apparatus of claim 16, wherein the processor is further configured to:
(f) encode, based on a channel code, a Q-th portion of the input bit stream to generate a Q-th bit stream; and
(g) perform step (f) for Q=1, 2, . . . , K.

18. The apparatus of claim 16, wherein the processor is further configured to:
repeat one or more bits of the Q-th bit stream a predetermined number of times; and/or
bit flip one or more bits of the Q-th bit stream.

19. The non-transitory computer-readable storage medium of claim 18, wherein the method further comprises:
repeating one or more bits of the Q-th bit stream a predetermined number of times; and/or
bit flipping one or more bits of the Q-th bit stream.

20. A non-transitory computer-readable storage medium having instructions stored thereupon for wireless communication, the instructions when executed by a processor, causes the processor to implement a method, comprising:
(a) rearranging a first bit stream corresponding to a first portion of an input bit stream to generate a first rearranged bit stream, wherein the input bit stream comprises K portions, wherein K is an integer greater than 1, and wherein the first rearranged bit stream is a first element of a set of K rearranged bit streams;
(b) rearranging a N-th bit stream corresponding to a N-th portion of the input bit stream to generate a N-th rearranged bit stream that is a N-th element of the set of K rearranged bit streams, wherein N is an integer;
(c) performing step (b) for N=2, 3, . . . , K;
(d) generating a modulated symbol stream of hierarchical quadrature amplitude modulation (QAM) symbols based on the set of K rearranged bit streams, wherein bits from the first rearranged bit stream correspond to one or more most significant bits of the hierarchical QAM symbols, wherein bits from a K-th rearranged bit stream correspond to one or more least significant bits of the hierarchical QAM symbols, and wherein bits from a second to (K−1)-th rearranged bit stream correspond to one or more remaining bits of the hierarchical QAM symbols,
wherein the hierarchical QAM symbols are selected from a superposition of multiple QAM constellations, and wherein each of the multiple QAM constellations comprises a distinct power ratio and a distinct rotation angle; and
(e) transmitting a signal generated from the modulated symbol stream, wherein the signal is generated by spreading the modulated symbol stream, wherein the spreading is based on a spreading factor and a spreading sequence, wherein the spreading sequence is from spreading sequences that have low cross correlation, wherein, in response to the spreading factor being 2, the spreading sequences are defined as [(1,1); (1,−1); (1,j); (1,−j); ($\sqrt{2}$,0); (0,$\sqrt{2}$); ($\sqrt{2}$j,0); (0,$\sqrt{2}$j)], and wherein $j^2=-1$.

21. The non-transitory computer-readable storage medium of claim 20, wherein the method further comprises:

(f) encoding, based on a channel code, a Q-th portion of the input bit stream to generate a Q-th bit stream; and (g) performing step (f) for Q=1, 2, . . . , K.

\* \* \* \* \*